United States Patent Office 3,381,524
Patented May 7, 1968

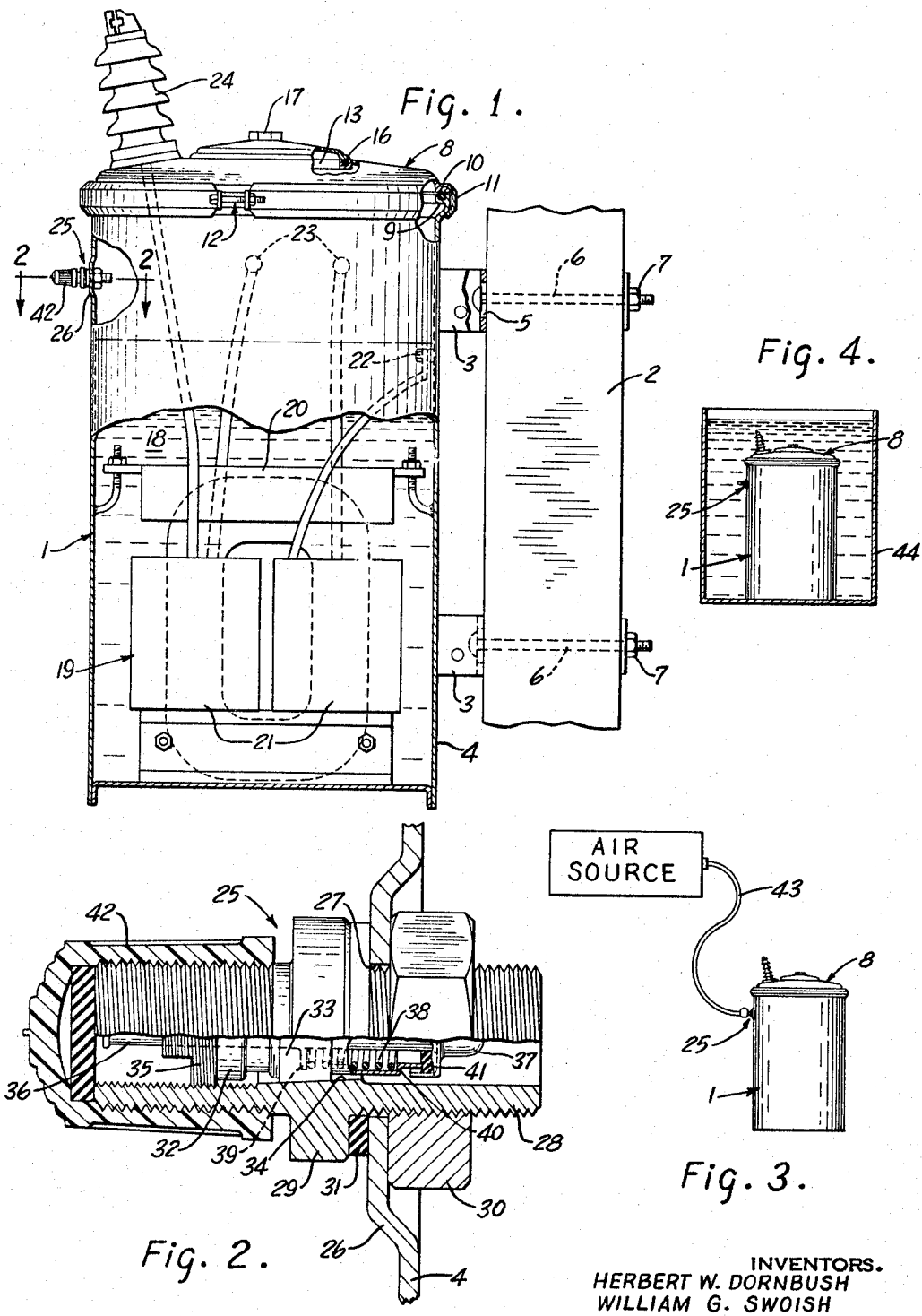

3,381,524
METHOD AND APPARATUS FOR TESTING HERMETICALLY SEALED TRANSFORMERS
Herbert W. Dornbush, Canonsburg, and William G. Swoish, Pittsburgh, Pa., assignors to McGraw-Edison Company, Milwaukee, Wis., a corporation of Delaware
Filed Feb. 23, 1966, Ser. No. 529,332
9 Claims. (Cl. 73—45.5)

ABSTRACT OF THE DISCLOSURE

An electrical high voltage transformer of the hermetically sealed type includes a hermetically sealed housing and an insulating oil covering the internal winding and core components. A valve is secured in the upper wall above the oil level. The valve includes a spring loaded core resiliently engaging a valve seat and accessible from the exterior to permit the lineman on a pole to actuate the valve to determine whether dangerous overpressures exist within the casing and to relieve any such overpressures before removing the cover, thereby eliminating a hazard to the lineman. The same valve may be employed to pressurize the tank and check the sealed condition of the transformer tank during the initial assembly of the transformer.

---

This invention relates to a method and apparatus for testing hermetically sealed transformers and particularly such electrical transformers for power distribution systems.

Electrical transformers for power distribution systems generally include a housing or casing within which the transformer coil and core assembly is mounted. The housing is filled with oil to a level somewhat above the upper level of the assembly and a cover is removably secured to the top of the casing with a sealing gasket disposed therebetween to hermetically seal the casing. The necessary electrical connections are made through suitable bushing and connectors in the cover or wall of the casing to maintain the hermetic enclosure of the internal components. Transformer failure may occur if the gaskets do not establish and maintain a hermetic seal as a result of breathing and drawing of air and moisture into the casing.

With the development of nitrile gaskets for transformer casings, the problem of loss of the seal in the field as a result of dry-out or permanent set have been substantially reduced such that transformer casings can retain internal pressure practically indefinitely. It will thus be appreciated that an efficient test at the factory to determine that the transformer casing does not leak will avoid many transformer failures in the field resulting from entrance of air and moisture into the casing.

The pole mounted transformer provided with such a reliable gasket however can develop substantial internal pressures which constitutes a hazard to servicing linemen. The dangerous overpressures within the transformer casing can result from incipient fault currents of a magnitude which will not operate the protective primary link or the secondary breaker by resistance heating. Such relatively low magnitude fault currents may persist for a substantial period of time however and heat the oil until the internal pressure reaches a dangerous level. Conventional transformers have no means for the lineman to determine if such high internal pressure exists within the casing before he removes the cover. Such high internal pressure can therefore shower hot oil on the lineman when he opens the casing cover or the hand hole cover to test the oil for dielectric strength and to change the primary fuse or operate the manual tap changer. Further, conventional transformers have no means which permit the lineman to determine whether or not a transformer casing has been "breathing," which would indicate that the dielectric strength of the oil has deteriorated.

The invention is particularly directed to simple and inexpensive means to provide an electrical transformer of the hermetically sealed type having means for easily and quickly testing the condition of the sealing means of the transformer at the factory and in the field. The present invention provides such an electrical transformer which permits the lineman on the pole to easily determine whether dangerous overpressures exist within the casing and to relieve any such overpressures before removing the cover, thereby eliminating a hazard to the lineman. The present invention thus provides an improved method of testing an electrical distribution transformer before and during connection in electrical power systems.

These and other objects and advantages of the invention will be more readily apparent from the following detailed description when considered in connection with the accompanying drawing.

In the drawing:

FIG. 1 is an elevational view, partly in section, of a distribution transformer embodying the invention;

FIG. 2 is an enlarged view taken along line 2—2 of FIG. 1;

FIG. 3 is a diagrammatic view showing pressurizing of the transformer casing; and FIG. 4 is a diagrammatic view showing one method for detecting a faulty seal of the casing.

Referring to the drawing, an electrical distribution transformer embodying the invention is shown having a generally cylindrical metallic casing 1 supported on a power pole 2, of which only a portion is shown. U-shaped mounting brackets 3 are welded to a side wall 4 of the casing 1 and provided with elongated mounting slots 5 in the web thereof. The web abuts the pole 2 and bolts 6 extend through the slot and through the pole 2 with clamping nuts 7 threaded onto the outer end of the bolts 6. The upper end of the casing is open and closed by a metallic cover 8 which is releasably attached thereto by any suitable releasable attachment means. In the illustrated embodiment, the upper end of casing side wall 4 is formed with a circumferential flange 9 defining a shoulder against which a resilient nitrile gasket 10 is compressed by a cover banding strap 11 to hermetically seal the casing 1. The strap 11 has a generally convex cross section to define lips engaging the underside of flange 9 and the edge of cover 8. The outer ends of the strap 11 are connected by a suitable releasable tensioning means 12 which are drawn up to force the cover 8 toward the flange 9 and compress gasket 10 to establish the hermetic seal. The means 12 may be released to permit removal of cover 8 from casing 1 by the lineman.

Cover 8 is also provided with a releasably covered hand hole 13 permitting access to the interior of casing 1. The hand hole 13 is normally closed by a hand hole cover 14 with a resilient nitrile gasket 16 compressed therebetween to provide a hermetic seal. The cover 14 is secured to the cover 8 in any suitable manner and is shown having a central securement bolt 17 which extends through a sealed opening into a suitable bar, not shown, spanning the cover opening.

Casing 1 contains an insulating dielectric fluid 18 such as transformer oil. A suitbale transformer core and coil assembly 19 is immersed in the oil 18 within casing 1. The illustrated assembly includes a magnetic core 20 having a pair of winding legs embraced by coils 21 which are wound and connected to provide the desired primary and secondary windings. The windings are shown connected by suitable leads to a ground lug 22 secured to metallic casing 1, to conductors (not shown) of secondary insulating bushings 23 affixed to casing side wall 4, and to a conductor (not shown) of a primary bushing 24 mounted on cover 8. As the details of the particular transformer core and winding construction are not necessary to a full and complete understanding of the present invention, no further description thereof is given.

In order to insure that the transformer oil 18 does not deteriorate in dielectric strength and sludge as a result of moisture and air entering the casing, it is desirable that the casing 10 is constructed and remains hermetically sealed. In accordance with the present invention, a pressure fitting and valve 25 is mounted in the side wall 4 of the casing 1 above the upper level of the oil 18 to provide controlled communication with the normal space between the cover and the upper level of the oil. A circular projection 26 with a flat bottom surface is provided in the casing side wall 4 and has a central aperture 27 with the valve 25 extending therethrough.

As most clearly shown in FIG. 2, the valve includes a core housing 28 which is externally threaded on opposite ends and includes a generally centrally located radial circumferential flange 29. The core housing is assembled within the side wall opening 27 with the flange on the outside of the casing 1 and the inner threaded shank projecting therethrough to receive a clamping nut 30. An annular gasket 31 surrounds the shank between the flange 29 and the flattened surface 26 such that tightening of the clamping nut 30 compresses the gasket 31 to provide a hermetic seal at the aperture 27. The gasket 31 is formed of a suitable rubber such as nitrile or the like which is employed for the cover gaskets. A valve core 32 of lead or other suitable material is slidably mounted within the valve core housing 28 and includes a valve shoulder 33 which may be covered with a suitable rubber engaging tapered valve seat 34 within the housing 28.

The outer shank of housing 28 is internally threaded to receive a clamping nut 35 which bears on the end of core 32 to firmly seat shoulder 33 upon seat 34 and maintain a hermetic seat at that point. A rod-like valve operator 36 projects through a central discharge passageway in core 32 and terminates at the inner end in a cup-shaped valve closure member 37 which is telescoped over the inner end of core 28. A coil spring 38 encircles the rod 36 and is compressed between a shoulder 39 on rod 36 and a shoulder 40 on the inner end of core 32 to continuously urge the rod 36 outwardly. A suitable gasket 41 is disposed between the end of the core 32 and the base of the closure member 37 to establish a hermetic seal over the inner end of the discharge passageway as a result of the force of spring 38. The spring 38 is selected to maintain a hermetic seal for negative as well as positive pressures.

A valve cap 42 which may be formed of a suitable plastic or the like threads onto the outer end of the housing to prevent entrance of foreign matter into housing 28.

The valve 25 provides a simple and inexpensive means for establishing and removing of pressure from within the casing during the initial manufacture and subsequent servicing of transformers.

During the manufacturing process, the covered casing 1 is tested in order to determine that it is in fact hermetically sealed. A positive pressure may be produced within casing 1 by connecting an air hose 43 from a suitable pneumatic source such as an air compressor to the valve 25 as shown in FIG. 3. The casing 1 is thus pressurized with clean dry air and the pressurized casing 1 is then immersed in a tank 44 of water or other liquid and visually observed to see if any air bubbles rise from the casing 1 through the liquid, as shown in FIG. 4. In the absence of any air bubbles, a visual indication is obtained that the casing 1 is in fact hermetically sealed. Alternative methods of checking may also be used. For example, a gas other than air such as a freon may be injected into casing 1 under a positive pressure through valve 25. A suitable detector, not shown, of freon gas is then utilized to determine if any leakage occurs from the transformer casing 1. After testing with either of the above or similar procedures, the valve 25 is actuated to relieve the pressure to atmospheric and the finished transformer transferred through the normal channels of trade.

As the pressure test fitting 25 is a permanent part of the transformer, the field service man can check the pressure in casing 1 to determine whether any breathing occurred. Thus, if a proper seal has been maintained, some pressure will be established in the casing as a result of normal operation. The service man may also relieve any built-up pressure before opening of covers 8 or 14 for servicing. This is of substantial significance because as previously noted, pressure can readily be built-up therein which can cause hot oil to be showered on a service man if the covers are opened in the presence of such pressures.

The present invention thus provides a simple and inexpensive means to increase the quality and reliability of a transformer and to reduce the hazards associated with the transformer.

Various modes of carrying out the invention are contemplated as being within the scope of the following claims particularly pointing out and distinctly claiming the subject matter which is regarded as the invention.

We claim:
1. A high voltage transformer, comprising
   a casing having a removable cap hermetically secured over an opening in said casing to define a hermetically sealed casing,
   a transformer winding and core assembly mounted within the casing, and
   a valve means secured within the wall of the casing, said valve being held closed under all pressure conditions within the casing and having an external input adapted to open the valve for establishing an internal pressure condition for checking of the hermetic sealing of the casing and for equalizing the pressure with respect to the surrounding ambient for subsequent servicing of the transformer assembly.
2. The transformer of claim 1 wherein the casing is partially filled with oil to a selected level and the valve is secured to the casing above the selected level, said valve having a resiliently mounted valve member held closed under all pressure conditions within the casing and adapted to receive a control element for opening the valve.
3. The transformer of claim 1 wherein said valve means includes a tubular valve housing hermetically sealed within an opening in the casing and having an internal valve seat, a valve closure member movably mounted within the housing and having a sealing portion mating with a valve seat, and resilient means urging said core into sealing engagement with the valve seat, said resilient means being sufficiently stressed to hold the valve closed under all internal pressure conditions.
4. The transformer of claim 1 wherein said casing includes an opening and said valve means includes an outer tubular housing extending through the opening and having a flange intermediate the length of the housing, a ring gasket encircling the housing and abutting the flange and the casing, and a clamping nut secured to the housing and holding the flange spaced from the casing to compress the gasket and seal the opening about the housing.
5. The transformer of claim 1 wherein said casing is filled with oil to a selected level to immerse the winding and core assembly and including an opening in the side wall above said selected level, and said valve means includes a tubular housing extending through the opening and having a clamping flange, a sealing gasket disposed between the clamping flange and the adjacent surface of the casing, a clamping nut threaded onto the housing to draw the flange toward the casing to compress the gasket and seal the opening about the housing, a tubular valve core releasably mounted within the housing in hermetic sealing engagement with an internal surface of the housing and having the inner end defining a valve seat, a valve member slidably mounted within the core and terminating at its inner end in a valve closure member adapted to engage the valve seat, resilient means coupled to the valve member and core and stressed to continuously urge the valve member outwardly to seat the valve closure member on said valve seat, said valve member being accessible through the exterior end of the housing to permit establishing and removing of a pressure within the casing.

6. The method of testing a hermetically sealed electrical transformer, said transformer having a casing with an opening closed by a cover means with a resilient gasket compressed between the cover means and casing and an insulating dielectric fluid in the casing within which a core and coil assembly is submerged and wherein high internal pressure can build up within said casing, comprising the steps prior to connection of the power system of providing a normally closed valve extending in hermetically sealed relation through a wall of said casing, said valve being operable to the open position from the exterior of the casing, connecting a source of fluid pressure to said valve whereby the valve is opened and a fluid at a positive pressure is injected through said valve into said casing to build up a positive pressure within said casing, disconnecting said source whereby the valve is closed, providing a detecting means responsive to said fluid about the casing to detect any leakage of fluid therefrom, and thereafter opening said valve to release said pressure.

7. The method of claim 6 wherein said step to detect leakage includes submerging said casing having said positive internal pressure within a body of liquid and observing whether bubbles arise from said casing through said liquid, and removing said casing from said liquid.

8. The method of claim 6 including the step subsequent to said connection of the transformer in a power system of periodically connecting a pressure gauge to said valve and measuring the pressure within said casing.

9. The method of claim 6 including the step subsequent to said connection of opening the valve to equalize the internal pressure to atmospheric pressure before removal of the cover.

References Cited
UNITED STATES PATENTS

| | | | |
|---|---|---|---|
| 2,172,311 | 9/1939 | Thomas | 137—322 |
| 2,214,865 | 9/1940 | Troy | 336—94 XR |
| 2,403,340 | 7/1946 | Camilli | 336—94 |
| 3,054,975 | 9/1962 | Barr | 336—90 |
| 3,064,466 | 11/1962 | Liers | 73—45.5 |

DAVID SCHONBERG, *Primary Examiner.*

D. O. WOODIEL, *Examiner.*